United States Patent
Welch et al.

(10) Patent No.: US 11,855,698 B2
(45) Date of Patent: *Dec. 26, 2023

(54) METHOD AND SYSTEM FOR A DISTRIBUTED OPTICAL TRANSMITTER WITH LOCAL DOMAIN SPLITTING

(71) Applicant: Luxtera LLC, Wilmington, DE (US)

(72) Inventors: Brian Welch, San Diego, CA (US); Xuelin Xu, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,678

(22) Filed: Dec. 22, 2021

(65) Prior Publication Data
US 2022/0231765 A1 Jul. 21, 2022

Related U.S. Application Data

(63) Continuation of application No. 16/926,452, filed on Jul. 10, 2020, now Pat. No. 11,228,374, which is a
(Continued)

(51) Int. Cl.
*H04B 10/516* (2013.01)
*H04B 10/524* (2013.01)
(Continued)

(52) U.S. Cl.
CPC ....... *H04B 10/516* (2013.01); *H04B 10/5055* (2013.01); *H04B 10/524* (2013.01); *H04B 10/541* (2013.01)

(58) Field of Classification Search
CPC .......... H04B 10/516; H04B 10/5055; H04B 10/524; H04B 10/541
(Continued)

(56) References Cited

U.S. PATENT DOCUMENTS 4,107,618 A * 8/1978 Ormond .................... H03F 3/45
330/108
5,074,631 A * 12/1991 Hamano ............... G02F 1/3136
385/3
(Continued)

FOREIGN PATENT DOCUMENTS

WO    WO-2008051429 A2 *   5/2008   ........... G02F 1/0123

OTHER PUBLICATIONS

Winzer et al; Advanced Modulation Formats for High-Capacity Optical Transport Networks; Dec. 2006; Journal of Lightwave technology vol. 24, No. 12; pp. 1-18. (Year: 2006).*
(Continued)

*Primary Examiner* — Amritbir K Sandhu
(74) *Attorney, Agent, or Firm* — Patterson + Sheridan, LLP

(57) ABSTRACT

Methods and systems for a distributed optical transmitter with local domain splitting are disclosed and may include, in an optical modulator integrated in a silicon photonics chip: receiving electrical signals, communicating the electrical signals to domain splitters along a length of waveguides of the optical modulator via one or more delay lines, and generating electrical signals in voltage domains utilizing the domain splitters for modulating the optical signals in the waveguides of the optical modulator by driving diodes with the electrical signals generated in the voltage domains. The delay lines may comprise one delay element per domain splitter, or may comprise a delay element per domain splitter for a first subset of the domain splitters and more than one delay element per domain splitter for a second subset of the domain splitters.

18 Claims, 8 Drawing Sheets

Related U.S. Application Data continuation of application No. 16/580,813, filed on Sep. 24, 2019, now Pat. No. 10,784,964, which is a continuation of application No. 16/188,899, filed on Nov. 13, 2018, now Pat. No. 10,425,165, which is a continuation of application No. 14/997,935, filed on Jan. 18, 2016, now Pat. No. 10,128,957, which is a continuation-in-part of application No. 14/922,916, filed on Oct. 26, 2015, now Pat. No. 9,654,227, which is a continuation of application No. 14/229,243, filed on Mar. 28, 2014, now Pat. No. 9,172,474, said application No. 14/997,935 is a continuation-in-part of application No. 14/196,122, filed on Mar. 4, 2014, now Pat. No. 9,548,811, which is a continuation of application No. 13/568,616, filed on Aug. 7, 2012, now Pat. No. 8,665,508, said application No. 14/229,243 is a continuation of application No. 12/208,650, filed on Sep. 11, 2008, now Pat. No. 8,687,981.

(60) Provisional application No. 62/125,291, filed on Jan. 16, 2015.

(51) Int. Cl.
 H04B 10/50 (2013.01)
 H04B 10/54 (2013.01)

(58) Field of Classification Search
 USPC .......................................................... 398/183
 See application file for complete search history.

(56) References Cited

U.S. PATENT DOCUMENTS

| | | | | |
|---|---|---|---|---|
| 5,394,260 | A * | 2/1995 | Suzuki | G02F 1/0121 372/12 |
| 6,259,466 | B1 * | 7/2001 | Oomura | B41J 2/471 347/237 |
| 6,970,152 | B1 * | 11/2005 | Bell | G09G 3/3688 345/55 |
| 7,095,543 | B1 * | 8/2006 | Hill | G02F 1/225 359/254 |
| 8,074,631 | B2 * | 12/2011 | Hu | F02P 3/0435 123/644 |
| 10,425,165 | B1 * | 9/2019 | Welch | H04B 10/524 |
| 10,784,964 | B2 * | 9/2020 | Welch | G02F 1/225 |
| 2008/0089634 | A1 * | 4/2008 | Mosinskis | G02F 1/0121 385/3 |
| 2014/0104666 | A1 * | 4/2014 | Minoia | G02F 1/0121 359/245 |
| 2018/0341164 | A1 * | 11/2018 | Williams | G02F 1/2257 |
| 2020/0225553 | A1 * | 7/2020 | Welch | G02B 6/12007 |

OTHER PUBLICATIONS

Patel; et al; Advanced Modulation Formats for High-Capacity Optical Transport Networks; Apr. 2018; Optical society of America; pp. 1-12. (Year: 2018).*

Spector et al; Compact Carrier Injection Based Mach-Zehnder Modulator in Silicon; 2007; Optical Society of America; pp. 1-3. (Year: 2007).*

Patel et al; Frequency response of dual drive silicon photonics modulators with coupling between electrodes; Apr. 2018; Optics Express; pp. 1-12. (Year: 2018).*

* cited by examiner

METHOD AND SYSTEM FOR A DISTRIBUTED OPTICAL TRANSMITTER WITH LOCAL DOMAIN SPLITTING

CROSS-REFERENCES TO RELATED APPLICATIONS/INCORPORATION BY REFERENCE

This application is a continuation of application Ser. No. 16/580,813 filed on Sep. 24, 2019, which is a continuation of application Ser. No. 16/188,899 filed on Nov. 13, 2018, now U.S. Pat. No. 10,425,165, which is a continuation of application Ser. No. 14/997,935 filed on Jan. 18, 2016, now U.S. Pat. No. 10,128,957, which is a continuation-in-part of application Ser. No. 14/922,916 filed on Oct. 26, 2015, now U.S. Pat. No. 9,654,227, and application Ser. No. 14/196,122 filed on Mar. 4, 2014, now U.S. Pat. No. 9,548,811. Said application Ser. No. 14/997,935 also claims priority to and the benefit of U.S. Provisional Application 62/125,291 filed on Jan. 16, 2015. Each of the above-referenced applications is hereby incorporated herein by reference in its entirety. Said application Ser. No. 14/922,916 is a continuation of application Ser. No. 14/229,243 filed on Mar. 28, 2014, now U.S. Pat. No. 9,172,474, which is a continuation of application Ser. No. 12/208,650 filed on Sep. 11, 2008, now U.S. Pat. No. 8,687,981. Said application Ser. No. 14/196,122 is a continuation of application Ser. No. 13/568,616 filed on Aug. 7, 2012, now U.S. Pat. No. 8,665,508.

FIELD

Certain embodiments of the disclosure relate to semiconductor photonics. More specifically, certain embodiments of the disclosure relate to a method and system for a distributed optical transmitter with local domain splitting.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for a distributed optical transmitter with local domain splitting, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for a distributed optical transmitter with local domain splitting. Exemplary aspects of the disclosure may comprise in an optical modulator integrated in a silicon photonics chip: receiving one or more electrical signals, communicating the one or more electrical signals to domain splitters along a length of waveguides of the optical modulator utilizing one or more delay lines, generating electrical signals in at least two voltage domains utilizing the domain splitters, modulating received optical signals in the waveguides of the optical modulator by driving diodes with the electrical signals generated in the at least two voltage domains, and generating a modulated output signal through interference of the modulated optical signal in the waveguides of the optical modulator. The one or more delay lines may comprise one delay element per domain splitter. The one or more delay lines may comprise a delay element per domain splitter for each of a first subset of the domain splitters and more than one delay element per domain splitter for a second subset of the domain splitters. The optical modulator may comprise a first input coupled to the first subset of the domain splitters and a second input coupled to the second subset of the domain splitters. A 4-level pulse amplitude modulated (PAM-4) output signal may be generated using electrical signals coupled to the first and second inputs. Each of the domain splitters may receive a differential input signal for generating the electrical signals in the at least two voltage domains. The received optical signals in the waveguides of the optical modulator may be generated using a continuous wave (CW) laser signal. The optical modulator may comprise a Mach-Zehnder Interferometer modulator. Each of the diodes may be driven utilizing two drivers with inputs coupled to one of the domain splitters. The one or more delay lines may comprise an array of complementary metal-oxide semiconductor (CMOS) inverters in series.

Figure 1A:
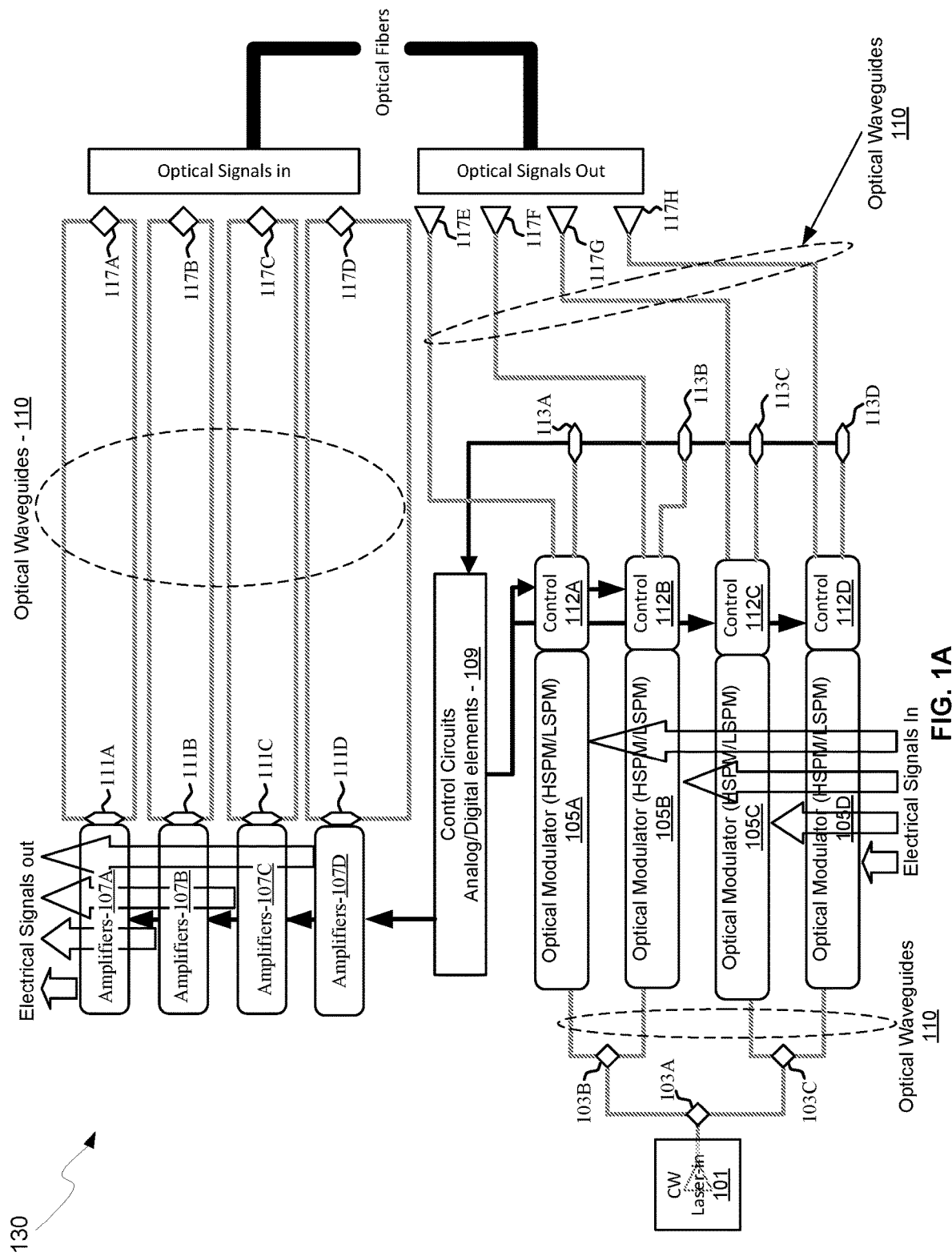
FIG. 1A is a block diagram of a photonically-enabled integrated circuit with distributed optical transmitters with local domain splitting, in accordance with an example embodiment of the disclosure.

FIG. 1A is a block diagram of a photonically-enabled integrated circuit with distributed optical transmitters with local domain splitting, in accordance with an example embodiment of the disclosure. Referring to FIG. 1A, there are shown optoelectronic devices on a photonically-enabled integrated circuit 130 comprising optical modulators 105A-105D, photodiodes 111A-111D, monitor photodiodes 113A-113D, and optical devices comprising couplers 103A-103C and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more continuous-wave (CW) optical signals to the coupler 103A. A CW optical signal may comprise an unmodulated optical signal comprising a coherent frequency component at a wavelength $\lambda_1$, for example. The photonically enabled integrated circuit 130 may comprise a single chip, or may be integrated on a plurality of die, such as with one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode. Such one mode may have, for example, a polarization that is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter may comprise at least one input waveguide and at least two output waveguides. The couplers 103A-103C shown in FIG. 1A illustrate 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam.

One output of each of the optical modulators 105A-105D may be optically coupled via the waveguides 110 to the grating couplers 117E-117H. The other outputs of the optical modulators 105A-105D may be optically coupled to monitor photodiodes 113A-113D to provide a feedback path. The IC 130 may utilize waveguide based optical modulation and receiving functions. Accordingly, the receiver may employ an integrated waveguide photo-detector (PD), which may be implemented with epitaxial germanium/SiGe films deposited directly on silicon, for example.

In optical modulators, power and signal integrity challenges increase at higher baud rates, and further optimization is difficult in current architectures. Mach-Zehnder driver architecture may be modified by splitting driver voltage domains to discrete unit drivers. The drivers may be placed in parallel and the high-speed serial distribution may be performed in a lower voltage domain, thereby keeping the high-bandwidth distribution in a single lower domain. One advantage of such a structure includes an immunity to supply mismatch between domains. Also, parallel placement of unit drivers allows them to be bandwidth "starved," which prevents jitter interactions due to pulse narrowing. In addition, the discrete unit drivers enables greater control of the delay path and electro-optical velocity matching.

The grating couplers 117A-117H may comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
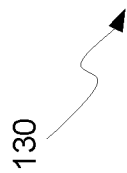
FIG. 1B is a diagram illustrating an exemplary photonically-enabled integrated circuit, in accordance with an example embodiment of the disclosure.
Figure 1B:
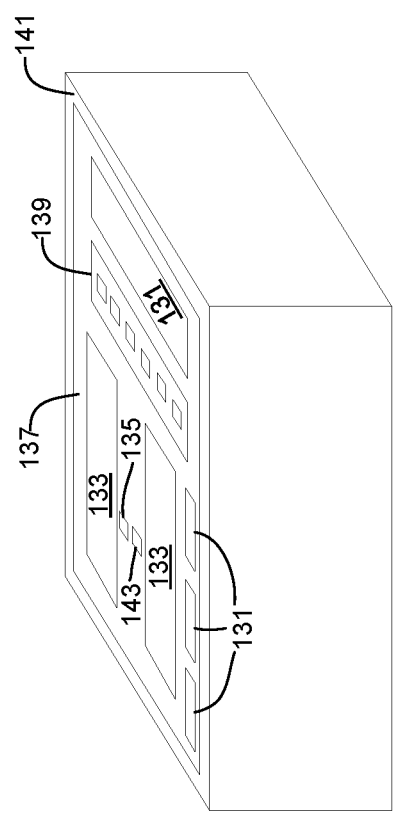

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enables modulation of the CW laser signal received from the splitters (e.g., couplers 103A-103C). The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors (e.g., photodiodes 111A-111D). The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103C, optical terminations, grating couplers 117A-117H, optical modulators 105A-105D, high-speed heterojunction photodiodes 111A-111D, and monitor photodiodes 113A-113D.

In an example scenario, the optical and optoelectronic devices 133 may comprise Mach-Zehnder interferometer modulators with local domain splitting. Accordingly, discrete unit drivers may be configured along the waveguides in the modulator, where drivers may be placed in parallel and thus the high-speed serial distribution may be performed in a lower voltage domain, thereby keeping the high-bandwidth distribution in a single lower domain.

Figure 1C:
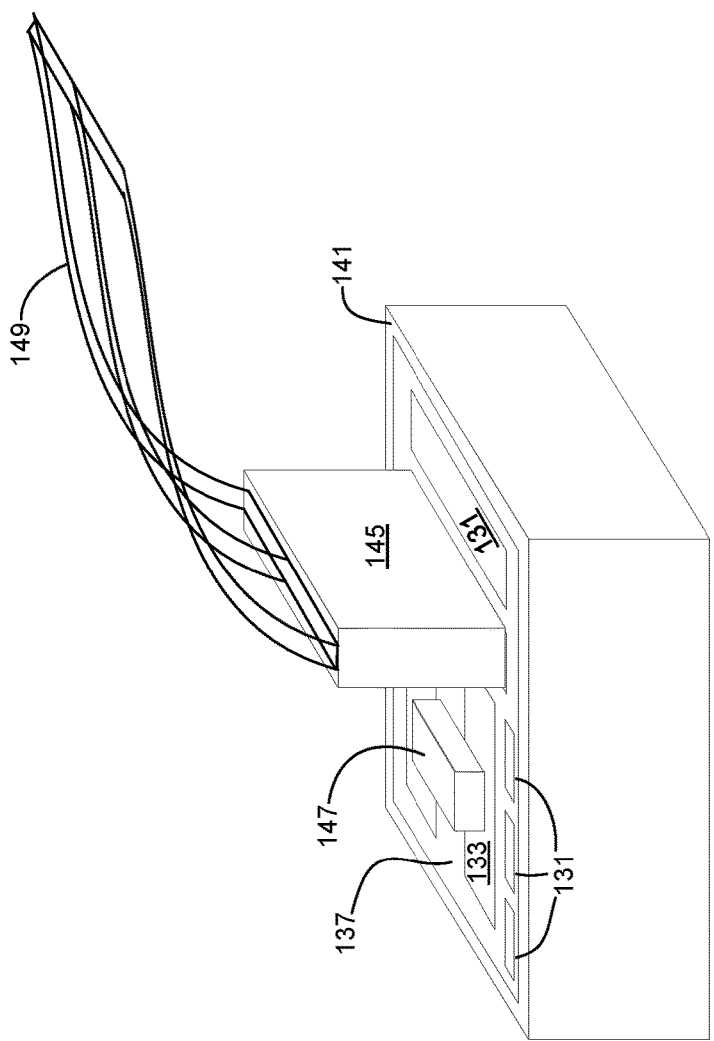
FIG. 1C is a diagram illustrating a photonically-enabled integrated circuit coupled to an optical fiber cable, in accordance with an example embodiment of the disclosure.
Figure 1C:
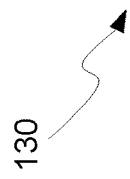

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137 and the CMOS guard ring 141. There are also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figure 2:
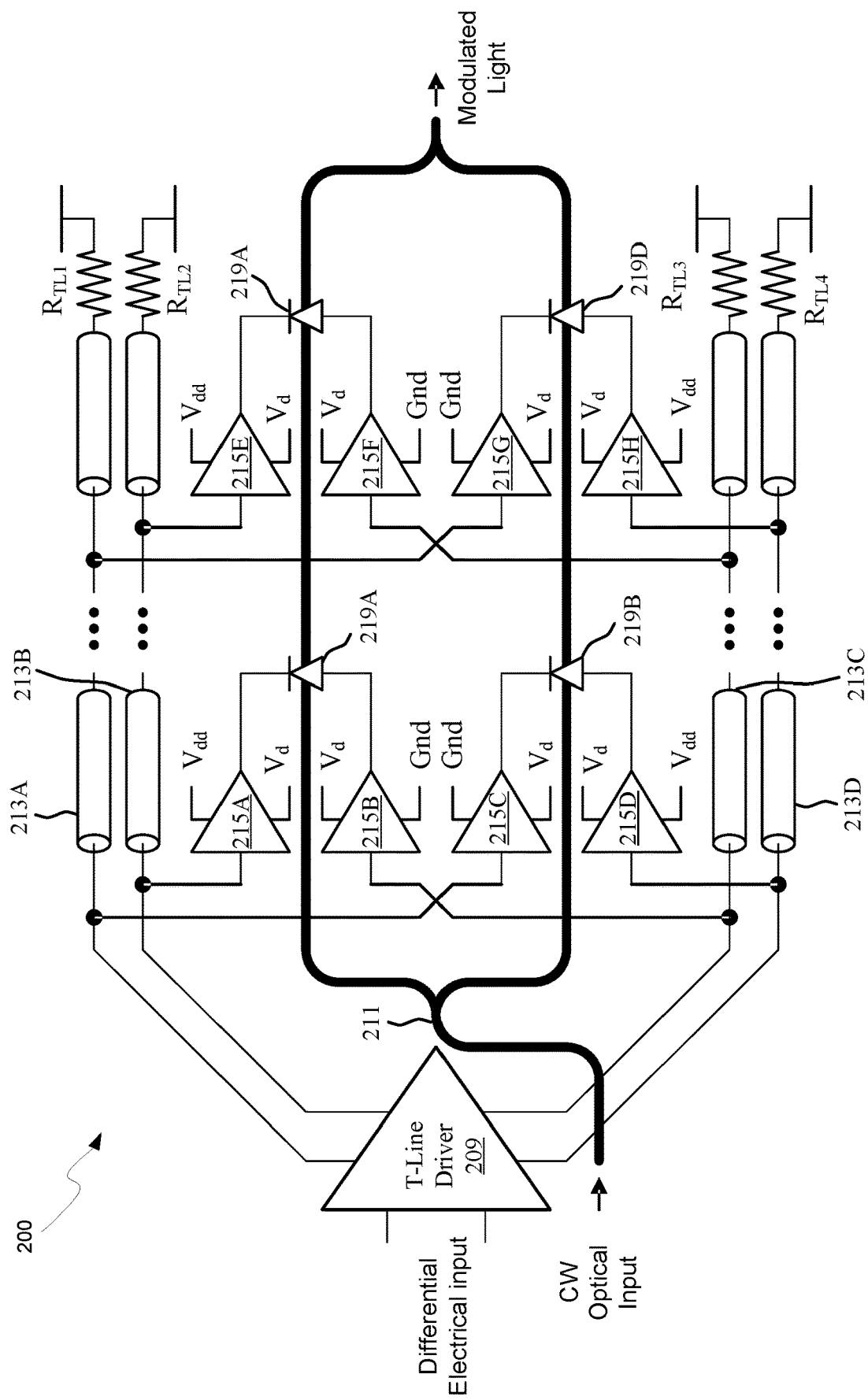
FIG. 2 is a block diagram of a split domain Mach-Zehnder modulator with global domain splitting, in accordance with an example embodiment of the disclosure.

FIG. 2 is a block diagram of a split domain Mach-Zehnder modulator with global domain splitting, in accordance with an example embodiment of the disclosure. Referring to FIG. 2, there is shown a split-domain Mach-Zehnder modulator (MZM) 200 comprising a transmission line driver 209, waveguides 211, transmission lines 213A-213D, diode drivers 215A-215H, diodes 219A-219D, and transmission line termination resistors $R_{TL1}$-$R_{TL4}$. There is also shown voltage levels $V_{dd}$, $V_d$, and Gnd. In an example scenario, $V_d$ is equal to a voltage of $V_{dd}/2$, thus generating two voltage domains, due to the symmetric nature of the stacked circuits of the transmission line driver 209. However, the disclosure is not limited to two voltage domains. Accordingly, any number of voltage domains may be utilized, dependent on the desired voltage swing of each domain and the total voltage range, defined here as $V_{dd}$ to ground. Similarly, the magnitude of the voltage range in each voltage domain may be a different value than other domains.

The transmission line (T-line) driver 209 comprises circuitry for driving transmission lines in an even-coupled mode, where the signal on each pair of transmission lines is equal except with a DC offset. In this manner, two or more voltage domains may be utilized to drive the diodes that generate index changes in the respective branches of the MZM 200. In another embodiment, the T-line driver 209 may drive transmission lines in odd-coupled mode. Even-coupled mode may result in a higher impedance in the transmission line, whereas odd-coupling may result in lower impedance.

The waveguides 211 comprise the optical components of the MZM 200 and enable the routing of optical signals around the CMOS chip 130. The waveguides 211 comprise silicon and silicon dioxide, formed by CMOS fabrication processes, utilizing the index of refraction difference between Si and SiO$_2$ to confine an optical mode in the waveguides 211. The transmission line termination resistors $R_{TL1}$-$R_{TL4}$ enable impedance matching to the T-lines 213A-213D and thus reduced reflections.

The diode drivers 215A-215H comprise circuitry for driving the diodes 219A-219D, thereby changing the index of refraction locally in the waveguides 211. This index change in turn changes the velocity of the optical mode in the waveguides 211, such that when the waveguides merge again following the driver circuitry, the optical signals interfere constructively or destructively, thus modulating the laser input signal. By driving the diodes 219A-219D with a differential signal, where a signal is driven at each terminal of a diode, as opposed to one terminal being tied to AC ground, both power efficiency and bandwidth may be increased due to the reduced voltage swing required in each domain.

In operation, a CW, or unmodulated, optical signal may be coupled into the "CW optical Input", and a modulating differential electrical signal is communicated to the T-line driver 209. The T-line driver 209 generates complementary electrical signals to be communicated over the T-lines 213A-213D, with each pair of signals offset by a DC level to minimize the voltage swing of each diode driver 215A-215H, while still enabling a full voltage swing across the diodes 219A-219D.

Reverse biasing the diodes 219A-219D generates field effects that change the index of refraction and thus the speed of the optical signal propagating through the waveguides 211. The optical signals then interfere constructively or destructively, resulting in the "Modulated Light" signal.

Figure 3:
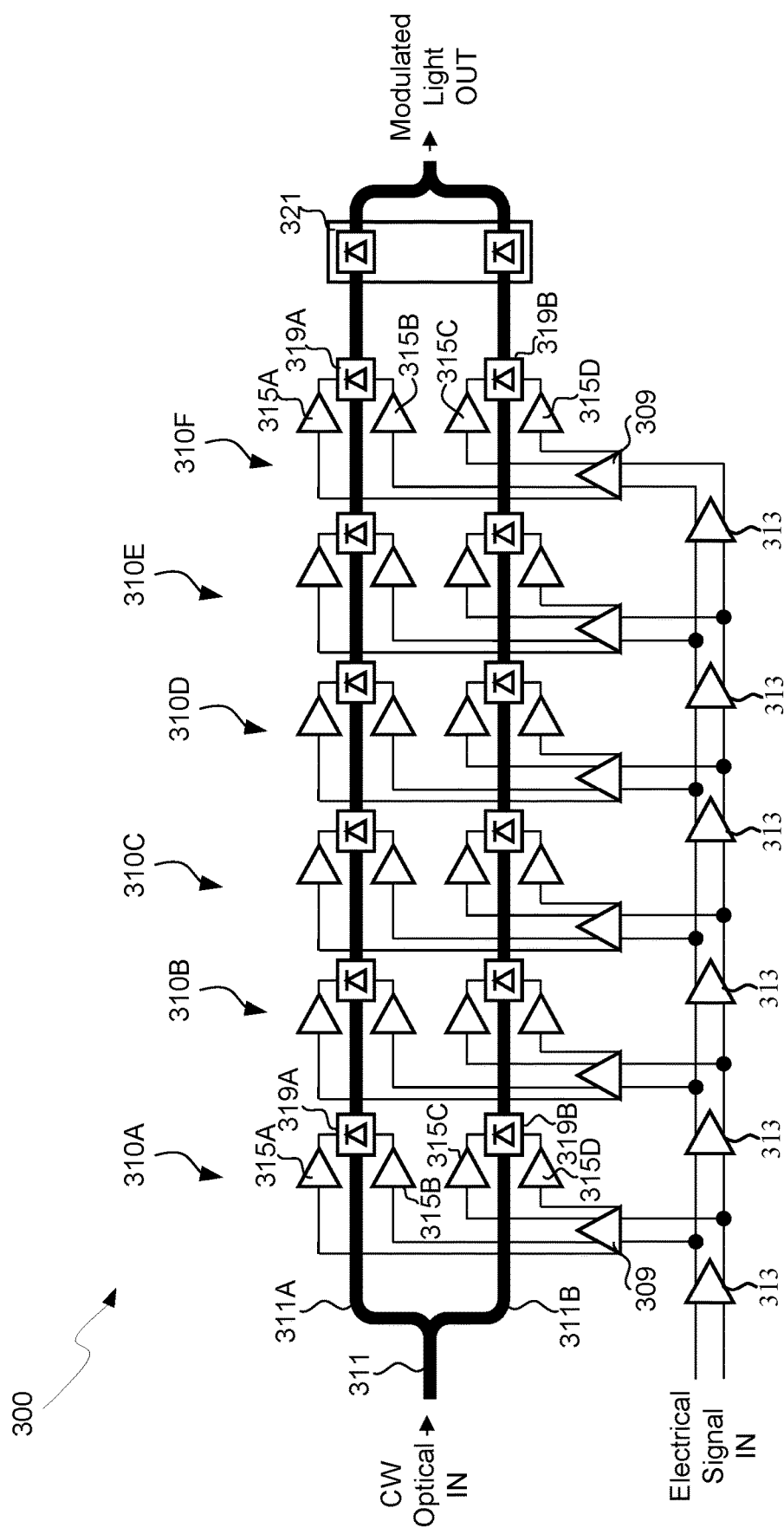
FIG. 3 is a block diagram of a split domain Mach-Zehnder modulator with local domain splitting, in accordance with an example embodiment of the disclosure.

FIG. 3 is a block diagram of a split domain Mach-Zehnder modulator with local domain splitting, in accordance with an example embodiment of the disclosure. Referring to FIG. 3, there is shown a locally split-domain Mach-Zehnder modulator (MZM) 300 comprising waveguides 311/311A, delay lines 313, a phase calibrator 321, and local modulator sections 310A-310F, each of which comprises a local domain splitter 309, diode drivers 315A-315D, and diodes 319A and 319B. Only the first and last instance of repeating elements are labeled in FIG. 3 for clarity.

In an example scenario, each of the local domain splitters 309 may generate two voltage domains for controlling the diode drivers 315A-315D, which in turn drive the diodes 319A and 319B. The voltage domains may be symmetric about a voltage, $V_d$, which in an example scenario may be equal to a voltage of $V_{dd}/2$, thus generating two voltage domains within a supply voltage $V_{dd}$. However, the disclosure is not limited to two voltage domains. Accordingly, any number of voltage domains may be utilized, dependent on the desired voltage swing of each domain and the total voltage range, defined here as $V_{dd}$ to ground. Similarly, the magnitude of the voltage range in each voltage domain may be a different value than other domains.

The waveguides 311 and 311A comprise the optical components of the MZM 200 and enable the routing of optical signals around the CMOS chip 130. The waveguides 311 comprise silicon and silicon dioxide, formed by CMOS fabrication processes, utilizing the index of refraction difference between Si and SiO$_2$ to confine an optical mode in the waveguides 311.

The six sets of diode drivers 315A-315D may comprise circuitry for driving the diodes 319A and 319B, thereby changing the index of refraction locally in the waveguides 311A. This index change in turn changes the velocity of the optical mode in the waveguides 311A, such that when the waveguides merge again into the single waveguide 311 following the driver circuitry, the optical signals interfere constructively or destructively, thus modulating the laser input signal. By driving the sets of diodes 319A and 319B with a differential signal, where a signal is driven at each terminal of a diode, as opposed to one terminal being tied to AC ground, both power efficiency and bandwidth may be increased due to the reduced voltage swing required in each domain.

Figure 5:
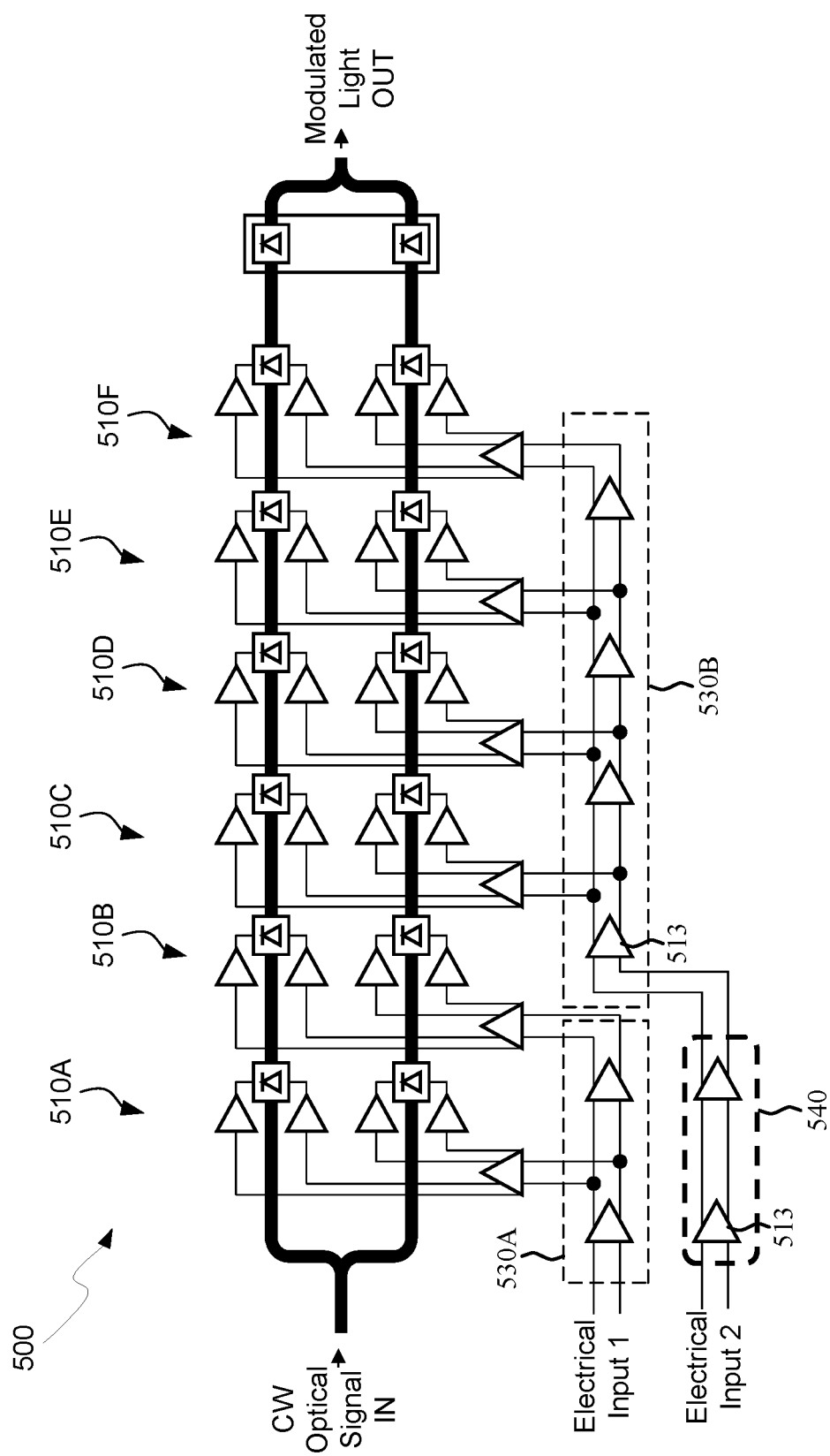
FIG. 5 is a block diagram of a split domain Mach-Zehnder modulator with extra delay matching for local domain splitting, in accordance with an example embodiment of the disclosure.

The phase calibrator 321 may comprise individually addressable diodes that may be operable to adjust the phase delay of the optical signal travelling in the waveguides 311A and 311B. The delay elements 313 may comprise CMOS delay elements, such as inverters or buffers, for example, for configuring the time delay of electrical signals to each of the local modulator sections 310A-310F. In the example shown in FIG. 3, the delay elements receive a single input for the series-connected delay elements. Other configurations are possible, as illustrated by FIG. 5, for example.

In operation, a CW, or unmodulated, optical signal may be coupled into the "CW optical In" input, and a modulating differential electrical signal may be coupled to the "Electrical Signal In" input. The received electrical signal may then be communicated to the local modulator sections 310A-310F via the delay elements 313.

The local domain splitters 309 may generate output signals offset by a DC level to minimize the voltage swing of each diode driver 315A-315D, while still enabling a full voltage swing across the diodes 319A and 319B in each modulator section 310A-310F. In an example scenario, each of the local domain splitters 309 may receive a differential input signal and generate two differential output signals.

In an example scenario, the domain splitters may comprise a pair of stacked of NFET and PFET source follower circuits, where a drain of one NFET coupled to a drain of one of the PFETs are coupled to a voltage domain boundary so that each pair then operates in a different voltage domain. Such a circuit is described in further detail in application Ser. No. 14/922,916, which is incorporated herein by reference in its entirety.

Reverse biasing the diodes 319A and 319B generates field effects that change the index of refraction and thus the speed of the optical signal propagating through the waveguides 311A. The optical signals then interfere constructively or destructively, resulting in the "Modulated Light" signal, which may comprise a non-return-to-zero (NRZ) signal, for example.

Figure 4:
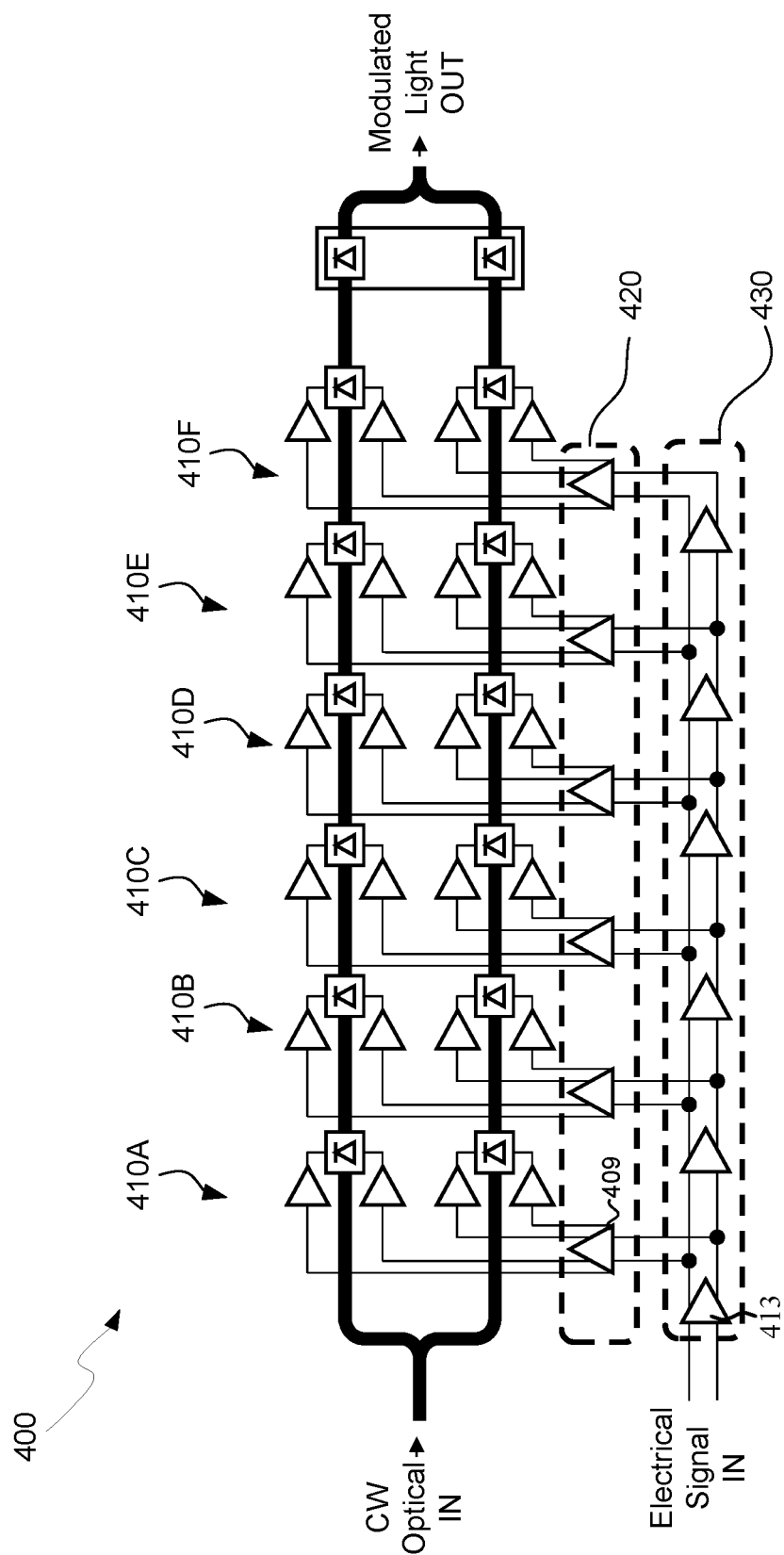
FIG. 4 is a block diagram of a split domain Mach-Zehnder modulator with a single delay line for local domain splitting, in accordance with an example embodiment of the disclosure.

FIG. 4 is a block diagram of a split domain Mach-Zehnder modulator with a single delay line for local domain splitting, in accordance with an example embodiment of the disclosure. Referring to FIG. 4, there is shown a locally split-domain MZM 400 substantially similar to MZM 300 with the delay line 430 comprising delay elements 413 and local domain splitting 420 comprising local domain splitters 409. Individual elements in the MZM 400 are substantially similar to those described with respect to MZM 300 of FIG. 3.

In the configuration shown, a single delay line 430 may be utilized to communicate a received single differential NRZ electrical signal to the local domain splitting 420, which may generate individual driving signals for each of the local modulator sections 410A-410F, resulting in an NRZ optical signal at the output of the MZM 400.

The modulators MZM 300 and MZM 400 shown in FIGS. 3 and 4 illustrate a single input configuration resulting in a single NRZ output, for example. However, the disclosure is not so limited. Multi-input modulators resulting in advanced encoding outputs may be configured using local domain splitters, as is illustrated in FIG. 5. In addition, non-MZI based modulators, such as phase shift keying, may utilize local domain splitters.

FIG. 5 is a block diagram of a split domain Mach-Zehnder modulator with extra delay matching for local domain splitting, in accordance with an example embodiment of the disclosure. Referring to FIG. 5, there is shown a locally split-domain MZM 500 substantially similar to MZM 400 but with the delay line comprising separate delay line sections 530A and 530B comprising delay elements 513 and added delay section 540 comprising delay elements 513. Individual elements in the MZM 500 may be substantially similar to those described with respect to MZM 300 and MZM 400 of FIGS. 3 and 4.

In the configuration shown, a first input signal, Input 1, may be communicated to the delay line section 530A and a second input signal, Input 2, may be communicated to the added delay section 540 and subsequently to the delay line section 530B. The output signals from the delay line sections 530A and 530B may be communicated to the local modulator sections 510A-510F where local domain splitters generate driver signals in separate voltage domains offset by a DC voltage, thereby driving the sets of diodes in the local modulator sections 510A-510F with a differential signal, where a signal is driven at each terminal of a diode, as opposed to one terminal being tied to AC ground. In this manner, both power efficiency and bandwidth may be increased due to the reduced voltage swing required in each domain.

The individual driving signals for each of the local modulator sections 510A-510F generate field effects that change the index of refraction and thus the speed of the optical signal propagating through the waveguides of the MZM 500. The optical signals then interfere constructively or destructively, resulting in the "Modulated Light Out" signal, which in this example results in a PAM-4 modulated optical signal at the output of the MZM 500.

Figure 6:
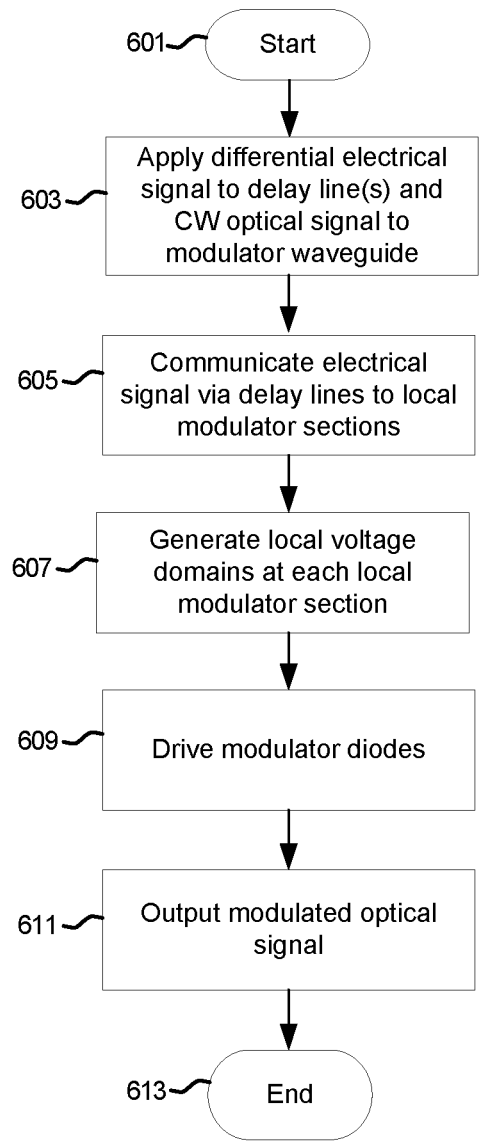
FIG. 6 is a flow chart illustrating example steps in the operation of a Mach-Zehnder modulator with local domain splitting, in accordance with an example embodiment of the disclosure.

FIG. 6 is a flow chart illustrating example steps in the operation of a Mach-Zehnder modulator with local domain splitting, in accordance with an example embodiment of the disclosure. In step 603, after start step 601, a differential electrical signal may be applied to one or more delay lines and a CW optical signal may be coupled to the waveguide of the MZM. In step 605, the electrical signal may be communicated to local modulator sections. In step 607, local voltage domains may be generated, i.e., domain splitting, at each local modulator section. In step 609, the MZM diodes may be driven by the signals in the different domains, thereby causing optical signals to be delayed by varying amounts at each local modulator section. Constructive and/or destructive interference of the optical signals in the waveguides then generate a modulated optical signal, followed by end step 611.

In an example embodiment, a method and system are disclosed for a distributed optical transmitter with local domain splitting. In this regard, aspects of the disclosure may comprise an optical modulator integrated in a silicon photonics chip, the optical modulator being operable to: receive one or more electrical signals, communicate the one or more electrical signals to domain splitters along a length of waveguides of the optical modulator utilizing one or more delay lines, generate electrical signals in at least two voltage domains utilizing the domain splitters, modulate received optical signals in the waveguides of the optical modulator by driving diodes with the electrical signals generated in the at least two voltage domains, and generate a modulated output signal through interference of the modulated optical signal in the waveguides of the optical modulator.

The one or more delay lines may comprise one delay element per domain splitter. The one or more delay lines may comprise a delay element per domain splitter for each of a first subset of the domain splitters and more than one delay element per domain splitter for a second subset of the domain splitters. The optical modulator may comprise a first input coupled to the first subset of the domain splitters and a second input to the second subset of the domain splitters. A 4-level pulse amplitude modulated (PAM-4) output signal may be generated using electrical signals coupled to the first and second inputs.

Each of the domain splitters may receive a differential input signal for generating the electrical signals in the at least two voltage domains. The received optical signals in the waveguides of the optical modulator may be generated using a continuous wave (CW) laser signal. The optical modulator may comprise a Mach-Zehnder Interferometer modulator. Each of the diodes may be driven utilizing two drivers with inputs coupled to one of the domain splitters. The one or more delay lines may comprise an array of complementary metal-oxide semiconductor (CMOS) inverters in series.

In another example embodiment, a system is disclosed for a distributed optical transmitter with local domain splitting. In this regard, aspects of the disclosure may comprise an optical modulator integrated in a silicon photonics chip, the optical modulator comprising: a pair of optical waveguides, local modulator sections arranged along the pair of optical waveguides, wherein each local modulator comprises a diode arranged in each optical waveguide, a pair of diode drivers for each diode, and a domain splitter that is operable to generate separate voltage domains for each of the diode drivers.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method, comprising:
communicating first electrical signals along waveguides of an optical modulator;
generating diode driving signals using the first electrical signals and in at least two voltage domains via domain splitters; and
modulating optical signals in the waveguides using the diode driving signals.

2. The method of claim 1, further comprising:
delaying the first electrical signals along the waveguides via delay elements corresponding to each of the domain splitters.

3. The method of claim 1, wherein the optical modulator includes a first input coupled to a first domain splitter of the domain splitters associated with a first voltage domain and a second input coupled to a second domain splitter of the domain splitters associated with a second voltage domain.

4. The method of claim 1, wherein the diode driving signals are generated via the domain splitters according to a differential input signal received by each of the domain splitters.

5. The method of claim 1, further comprising:
generating a 4-level pulse amplitude modulated (PAM-4) output signal via the first electrical signals.

6. The method of claim 1, further comprising:
generating the optical signals via a continuous wave (CW) laser.

7. The method of claim 1, wherein modulating the optical signals in the waveguides comprises:
driving diodes with the diode driving signals generated in at least two voltage domains to modulate the optical signals in the waveguides.

8. The method of claim 7, wherein the optical modulator is a Mach-Zehnder Interferometer.

9. The method of claim 7, wherein each of the diodes is driven by two drivers that each have inputs coupled to one of at least two domain splitters.

10. A system, comprising:
waveguides; and
an optical modulator configured to:
communicate first electrical signals along the waveguides;
generate diode driving signals using the first electrical signals and in at least two voltage domains via domain splitters; and
modulating optical signals in the waveguides using the diode driving signals.

11. The system of claim 10, further comprising:
delay elements corresponding to each of the domain splitters disposed on the waveguides.

12. The system of claim 10, wherein the diode driving signals are generated via the domain splitters according to a differential input signal received by each of the domain splitters.

13. The system of claim 10, wherein the optical modulator includes a first input coupled to a first domain splitter of the domain splitters associated with a first voltage domain and a second input coupled to a second domain splitter of the domain splitters associated with a second voltage domain.

14. The system of claim 10, wherein modulating the optical signals in the waveguides comprises:
driving diodes with the diode driving signals generated in at least two voltage domains to modulate the optical signals in the waveguides.

15. The system of claim 14, further comprising:
a continuous wave (CW) laser that generates the optical signals modulated by the diodes.

16. The system of claim 15, wherein the optical modulator is a Mach-Zehnder Interferometer.

17. The system of claim 15, wherein each of the diodes is driven by two drivers that each have inputs coupled to one of at least two domain splitters.

18. An optical modulator, comprising:
a first optical waveguide;
a second optical waveguide;
a first diode arranged on the first optical waveguide;
a second diode arranged on the second optical waveguide; and
a domain splitter configured to generate separate voltage domains for each of the first diode and the second diode.

* * * * *